US010824631B2

(12) United States Patent
Rikukawa et al.

(10) Patent No.: US 10,824,631 B2
(45) Date of Patent: Nov. 3, 2020

(54) INFORMATION VIEWING SYSTEM

(71) Applicants: Yoshimori Rikukawa, Yokohama (JP); Noboru Shinohara, Yokohama (JP)

(72) Inventors: Yoshimori Rikukawa, Yokohama (JP); Noboru Shinohara, Yokohama (JP)

(*) Notice: Subject to any disclaimer, the term of this patent is extended or adjusted under 35 U.S.C. 154(b) by 116 days.

(21) Appl. No.: 15/543,394

(22) PCT Filed: Jan. 15, 2016

(86) PCT No.: PCT/JP2016/051136
§ 371 (c)(1),
(2) Date: Jul. 13, 2017

(87) PCT Pub. No.: WO2016/114391
PCT Pub. Date: Jul. 21, 2016

(65) Prior Publication Data
US 2018/0004821 A1  Jan. 4, 2018

(30) Foreign Application Priority Data
Jan. 15, 2015  (JP) .................. 2015-005569

(51) Int. Cl.
G06F 16/248  (2019.01)
G06F 16/9535  (2019.01)
G06F 16/9038  (2019.01)

(52) U.S. Cl.
CPC ........ *G06F 16/248* (2019.01); *G06F 16/9038* (2019.01); *G06F 16/9535* (2019.01)

(58) Field of Classification Search
CPC .... G06F 16/00; G06F 16/248; G06F 16/9038; G06F 16/9535

(Continued)

(56) References Cited

U.S. PATENT DOCUMENTS 6,363,375 B1* 3/2002 Hoshino ............. G06F 16/3323
8,185,549 B1* 5/2012 McDade ............... G06F 16/954
707/782

(Continued)

FOREIGN PATENT DOCUMENTS

JP  2002-183039  6/2002
JP  2006-309515  11/2006
JP  2011-107826  6/2011

OTHER PUBLICATIONS

International Search Report dated Mar. 15, 2016, in corresponding International Patent Application No. PCT/JP2016/051136.

(Continued)

*Primary Examiner* — Jay A Morrison
*Assistant Examiner* — Xiaoqin Hu
(74) *Attorney, Agent, or Firm* — Staas & Halsey LLP

(57) ABSTRACT

An information viewing system that allows a viewer to efficiently display its desired posted article by a simple operation. According to the present invention, a front server includes an information page creating unit that creates a plurality of hierarchical information pages and search result pages, using data items stored in the information database, a posted page creating unit that extracts from the posted article database, a posted article associated with an information page displayed on the communication terminal and a posted article associated with a lower-order information page of the information page displayed, to create a posted page corresponding to the information page displayed, and a communication processing unit that sends the information page and the posted page to the communication terminal to display therein.

6 Claims, 9 Drawing Sheets

(58) Field of Classification Search
USPC .................................................. 707/600–899
See application file for complete search history.

(56) References Cited

U.S. PATENT DOCUMENTS

2006/0123361 A1* 6/2006 Sorin .................... G06F 16/954
  715/854
2007/0094241 A1* 4/2007 M. Blackwell ....... G06F 16/951

OTHER PUBLICATIONS

International Written Opinion, PCT/ISA/237, dated Mar. 15, 2016, in corresponding International Patent Application No. PCT/JP2016/051136.

* cited by examiner

INFORMATION VIEWING SYSTEM

CROSS-REFERENCE TO RELATED APPLICATION

This application is a U.S. National Stage application which claims the benefit under 35 U.S.C. § 371 of PCT International Patent Application No PCT/JP2016/051136, filed Jan. 15, 2016, which claims the foreign priority benefit under 35 U.S.C. § 119 of Japanese Patent Application No. 2015-005569, filed Jan. 15, 2015, the contents of which are incorporated herein by reference.

TECHNICAL FIELD

The present invention relates to an information viewing system that has a function to have a third party to view a posted article by utilizing a communication network.

BACKGROUND ART

As a conventional system for having a third party to view posted articles by utilizing a communication network, electronic bulletin boards disclosed in Japanese Patent Laid-open Publication No. 2002-183039 mentioned below, for example, have been known.

The electronic bulletin boards disclosed in Japanese Patent Laid-open Publication No. 2002-183039 classify posted articles, based on a plurality of classification items, and allow selection of a desired classification item from among the classification items listed in a drop-down list (see [0045] and FIG. 10, for example, of Japanese Patent Laid-open Publication No. 2002-183039).

A viewer of such electronic bulletin boards can select the kind of a posted article which the viewer wishes to view from among the plurality of classification items to thereby display only posted articles which the viewer wishes to view. The viewer then selects a posted article which the viewer wishes to view, while referring to the titles of the posted articles.

SUMMARY OF INVENTION

Technical Problem

Unfortunately, the above described conventional electronic bulletin boards do not allow a viewer to readily select its desired classification item when many classification items are available for posted articles.

For example, in an example of electronic bulletin boards of information sites for stock investors in which articles concerning various industries and companies can be posted and viewed, when all industries and companies are listed, using the above mentioned drop-down list and the titles of posted articles, a huge number of classification items and titles will be resultantly shown. This will hinder a viewer from readily finding its desired posted article.

Moreover, a viewer of such information sites for stock investors may want to study economic information on a specific industry or company while referring to posted articles relevant to the economic information. In such a case, searching for relevant posted articles while shifting each time to pages on the electronic bulletin boards is very inefficient.

It is an object of the present invention to provide an information viewing system that allows a viewer to efficiently display its desired posted article by a simple operation when a huge number of classification items for posted articles are available or a viewer wants to view a posted article corresponding to specific information.

Solution to Problem

An information viewing system according to the present invention includes an information database to store a plurality of data items; a posted article database to store a posted article posted with respect to the data so as to be associated with corresponding data; and a front server connected to a communication terminal via a communication network, wherein the front server has an information page creating unit to create a plurality of hierarchical information pages, using the plurality of data items stored in the information database, a posted page creating unit to extract from the posted article database, the posted article associated with the information page displayed on the communication terminal, and the posted article associated with each lower-order information page of the information page displayed to create the posted page corresponding to the information page displayed, and a communication processing unit to send the information page and the posted page to the communication terminal to display therein.

It is preferable that the information viewing system according to the present invention may further include a search processing unit to search for the data stored in the information database in response to a request from the communication terminal, wherein the information page creating unit may create hierarchical search result pages, based on a result of a search by the search processing unit, the posted page creating unit may extract from the posted article database the posted article associated with the search result page displayed on the communication terminal and the posted article associated with each of lower-order search result pages of the search result page displayed to create the posted page corresponding to the search result page displayed, and the communication processing unit may send the information page and the posted page to the communication terminal to display therein.

It is preferable, in the information viewing system according to the present invention, that when a display change operation is executed to shift to the posted page while any of the information page and the search result page is displayed, the communication terminal may request the front server to send the posted page corresponding to the information page or the search result page.

It is preferable, in the information viewing system according to the present invention, that when a display change operation is executed to shift to the information page or the search result page while any of the posted articles is selected, the communication terminal may display the information page or the search result page corresponding to the posted article.

Advantageous Effects of Invention

According to the present invention, hierarchical information pages are created and a posted page including a posted article corresponding to the information page and a posted article corresponding to each lower-order information page of the information page is created. With the above, a viewer can efficiently view a posted article corresponding to a selected information page by a simple operation.

According to the present invention, when a viewer searches, a posted page corresponding to the search results is automatically created. With the above, the viewer can efficiently view a search result page, with reference to a posted page corresponding to the search result, by a simple operation.

According to the present invention, when a display changing operation is executed in a communication terminal to switch from an information page to a posted page, the front server provides the posted page to the communication terminal. With the above, a viewer can efficiently view a posted article corresponding to the information page by a simple operation.

According to the present invention, when a display changing operation is executed in a communication terminal with any posted article selected, an information page corresponding to the posted article is displayed. That is, it is possible to directly switch from the posted page to an information page corresponding to the posted page. With the above, a viewer can efficiently view an information page corresponding to the posted article by a simple operation.

DESCRIPTION OF EMBODIMENTS

Figure 1:
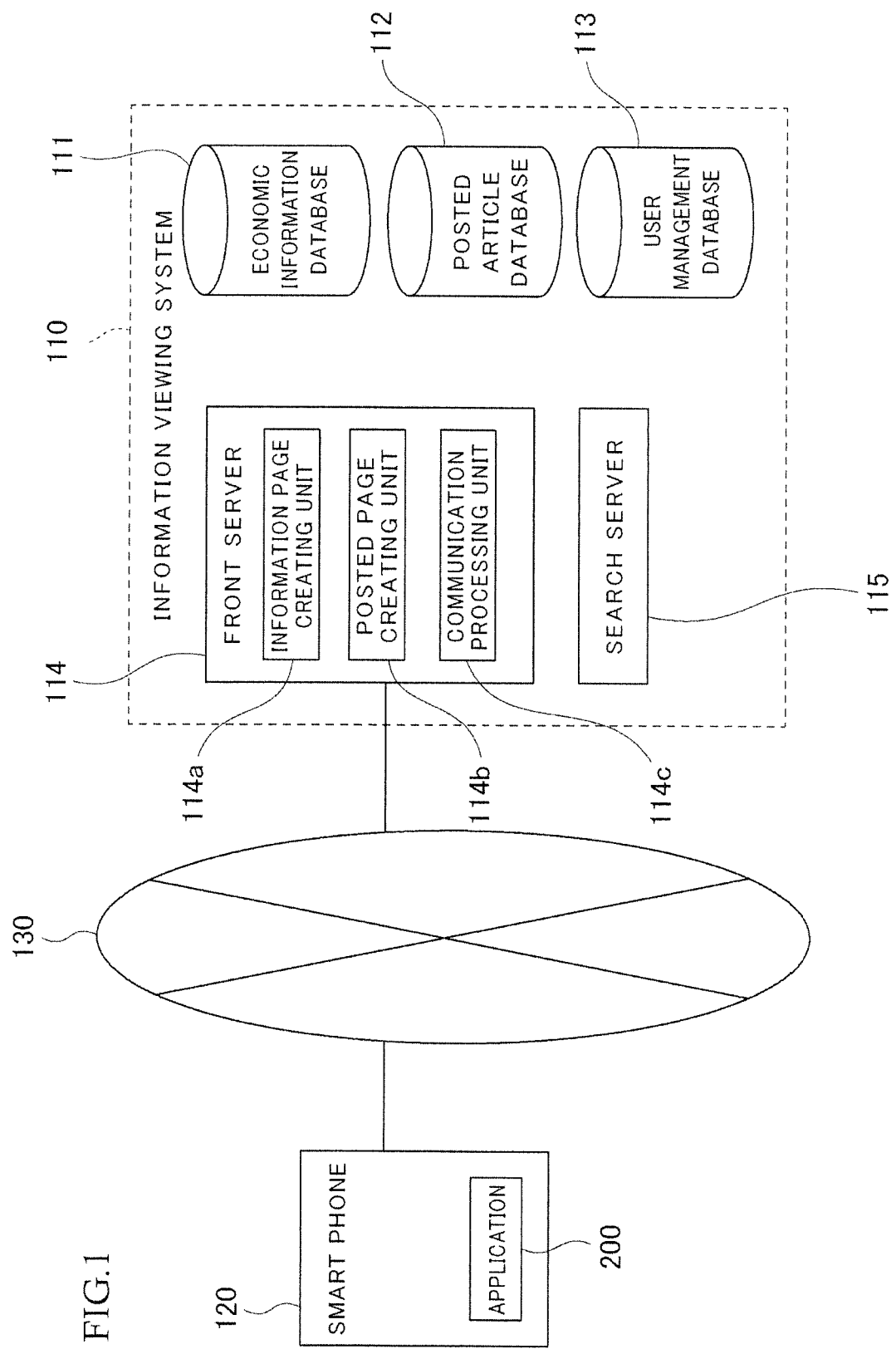
FIG. 1 is a conceptual diagram showing a network structure according to a first embodiment.

The following describes a first embodiment of the present invention, referring to the drawings. This embodiment will be described by referring to an example in which the present invention is applied to an information viewing system that provides economic information and posted articles for every industry, company to stock investors and so forth.

FIG. 1 is a conceptual diagram showing a network structure in the first embodiment.

As illustrated in FIG. 1, a communication network in the first embodiment includes an information viewing system 110 and a smart phone 120 connected to each other for communication via the Internet 130.

The information viewing system. 110 includes an economic information database 111, a posted article database 112, a user management database 113, a front server 114, and a search server 115.

The economic information database 111 stores viewing data (company attribute information and settlement data, for example) for a registered user to view. Viewing data is obtained by collecting information disclosed on companies' websites and information for legal disclosure, for example, and stored in the economic information database 111.

The posted article database 112 stores an article (hereinafter referred to as a "posted article") posted by a registered user with respect to an information page (to be described later) so as to be associated with the information page.

The user management database 113 stores attribute information on a registered user (personal information, authentication information on a registered user and so forth).

The front server 114 executes processing, including user registration processing and processing for displaying viewing data and a posted article on a smart phone 120 of the user. The front server 114 includes an information page creating unit 114a, a posted page creating unit 114b, and a communication processing unit 114c. These units 111a to 111c can be implemented through software, for example.

The information page creating unit 114a creates hierarchical information pages, using various viewing data stored in the economic information database 111. Information pages may be created regularly, for every update of any viewing data in the economic information database 111, or every request from the smart phone 120. When the search server 115 searches, the information page creating unit 114a may create hierarchical search result pages, based on the search results.

With any of the hierarchical information pages displayed through operation of the smart phone 120, the posted page creating unit 114b reads out posted articles relevant to the information page displayed and lower-order information pages of the displayed information page from the posted article database 112 to create a posted page. When the search server 115 searches for viewing data, the posted page creating unit 114b may create a posted page, using posted articles relevant to a search result page displayed on the smart phone 120 and lower-order search result pages of the displayed search result page. A posted page may be created, for example, for every receipt of a request for transmission of a posted page from the smart phone 120.

The communication processing unit 114c receivers a request or the like from the smart phone 120, and sends for display to the smart phone 120 the information page and the search result page both created by the information page creating unit 114a and the posted page created by the posted page creating unit 114b.

The search server 115 corresponds to a "search processing unit" according to the present invention, and searches for viewing data stored in the economic information database 111 in response to a request from the smart phone 120.

The smart phone 120 corresponds to a "communication terminal" according to the present invention. The smart phone 120 has an application software 200 installed therein (hereinafter referred to as an "application"). The application 200 obtains an information page, a search result page, and a posted page from the front server 114 of the information viewing system 110 to display. The communication terminal according to the present invention may be implemented using a tablet terminal, a portable phone, or a personal computer, for example.

The Internet 130 corresponds to a "communication network" according to the present invention, and connects for communication the information viewing system 110 and the smart phone 120.

The following describes the operation of the information viewing system 110 according to the first embodiment with reference to FIGS. 2A to 5B. FIGS. 2A to 5B are conceptual diagrams showing a screen displayed on the smart phone 120.

On the screen of the smart phone 120, a central panel and a right panel are selectively displayed. The central panel displays information pages 210, 220, 230 and search result pages 610, 620, to be described later, while the right panel displays a posted page to be described later. Switching to display from the central panel to the right panel is effected in response to a leftward swipe (that is, in response to a leftward movement of a finger touching the display screen). In the case of a communication terminal having a large screen, such as a tablet terminal or a personal computer, the central panel and the right panel may be displayed at the same time.

(1) Operation for Displaying Information Page

Initially, the operation for displaying an information page in the first embodiment will be described.

The application 200, after being activated in the smart phone 120, causes the front server 114 to execute log-in processing etc., and requests to send an information page.

The application 200 stores four variables, namely [industry code, company code, search word, URL] as variables for display condition. The application 200 rewrites these variables in accordance with a page displayed on the central panel (that is, the information pages 210 to 230 and the search result pages 610, 620), as will be described later.

Having received the request from the application 200, the front server 114 sends an information page (that is, a web display program for displaying the information page on the smart phone 120). In the above, the front server 114 may send all the hierarchical information pages or only the highest-order information page 210 (see FIG. 2A) at that time with a page at a lower layer to be sent later upon a request from the application 200.

Figure 2A:
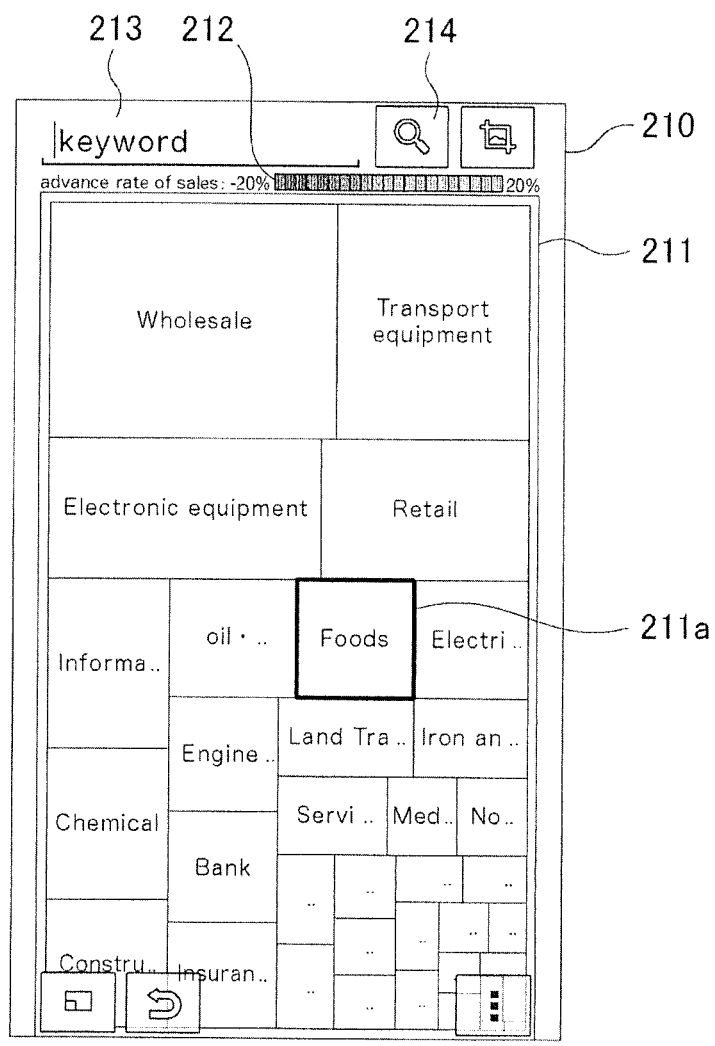
FIG. 2A is a conceptual diagram showing a screen on a communication terminal according to the first embodiment.

As illustrated in FIG. 2A, the highest-order information page 210 shows a tree map 211 showing sales for every industry, a color scale 212, a keyword input box 213, and a search button 214. With the highest-order information page 210 displayed, the application 200 sets the variables for display condition as [industry code=null, company code=null, search word=null, URL=null].

In the tree map 211, the area of a rectangular region 211a for each industry is determined depending on the sales of the industry. The color of the rectangular region 211a is determined so as to change gradually in accordance with the growth rate of the sales.

By operating the smart phone 120, it is possible to change the number of industries (the number of rectangular regions) for concurrent display on the information page 210 and to enlarge or reduce the size of display.

In the color scale 212, a color same as the color used to display the rectangular region 211a is arranged sequentially, starting from the side for a low-growth rate.

With a tap on a desired rectangular region 211a (the rectangular region for "foods" in FIG. 2A) in the tree map 211, the rectangular region 221a is selected, and displayed enhanced (for example, the frame is drawn by a thicker line). Concurrently, the color region corresponding to the rectangular region 211a selected is enhanced in the color scale 212.

Figure 2B:
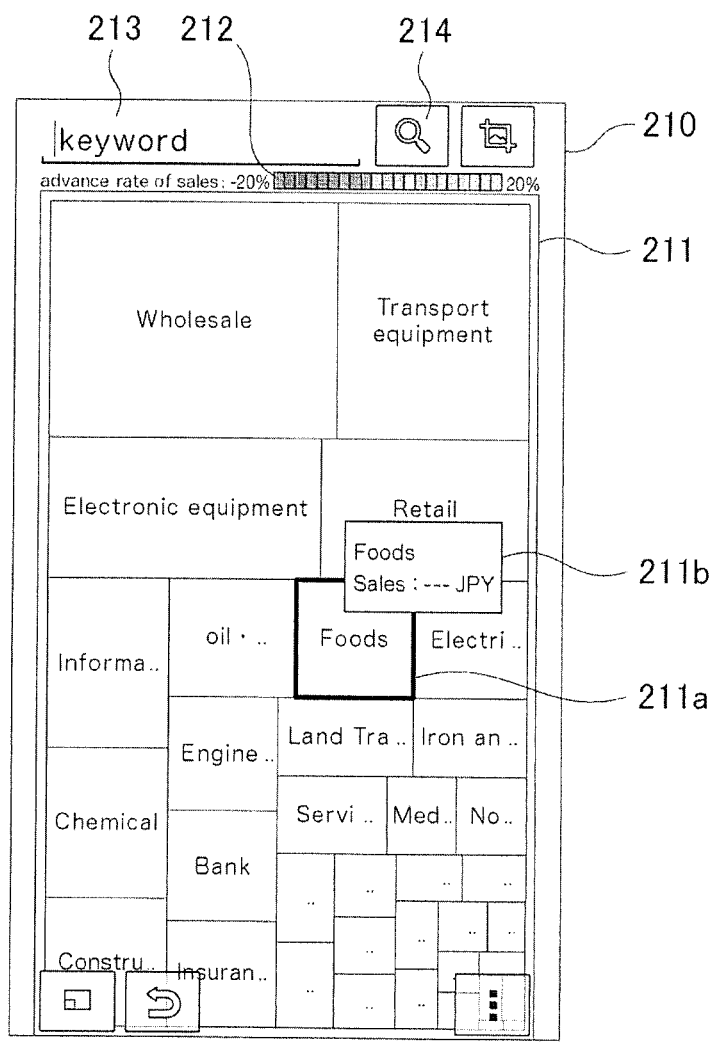
FIG. 2B is a conceptual diagram showing a screen on a communication terminal according to the first embodiment.

Subsequently, with a long press on the selected rectangular region 211a by a finger, the application 200 displays a pop-up screen 211b near the rectangular region 211a (see FIG. 2B). The pop-up screen 211b shows, for example, the name of an industry corresponding to the selected rectangular region 211a and total sales of the industry, for example.

Figure 3A:
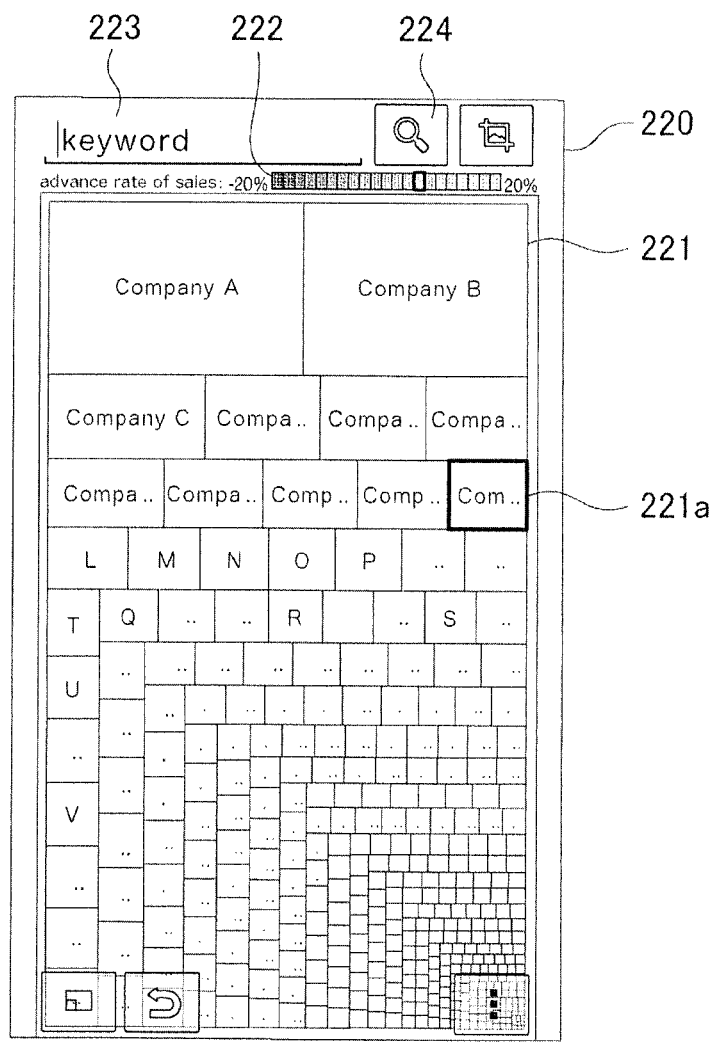
FIG. 3A is a conceptual diagram showing a screen on a communication terminal according to the first embodiment.

With a tap on the selected rectangular region 211a, the application 200 displays an information page 220 in the second layer (see FIG. 3A). The information page 220 shows a tree map 221 showing sales for every company in the selected industry, a color scale 222, a keyword input box 223, a search button 224, or the like. The area and color of each rectangular region in the tree map 221 are determined similarly to the tree map 211 described above. Arrangement or the like of the color in the color scale 222 is the same as that of the color scale 212 described above.

With this information page 220 displayed, the application 200 sets the variable for display condition as [industry code=the industry code of the industry selected, company code=null, search word=null, URL=null].

By operating the smart phone 120, it is possible to change the number of industries (the number of rectangular regions) for concurrent display on the information page 220, to enlarge or reduce the size of display, and to return to the information page 210 to display.

With a tap on the rectangular region 221a corresponding to a desired company in the tree map 221, the rectangular region 221a is selected, and displayed enhanced.

Figure 3B:
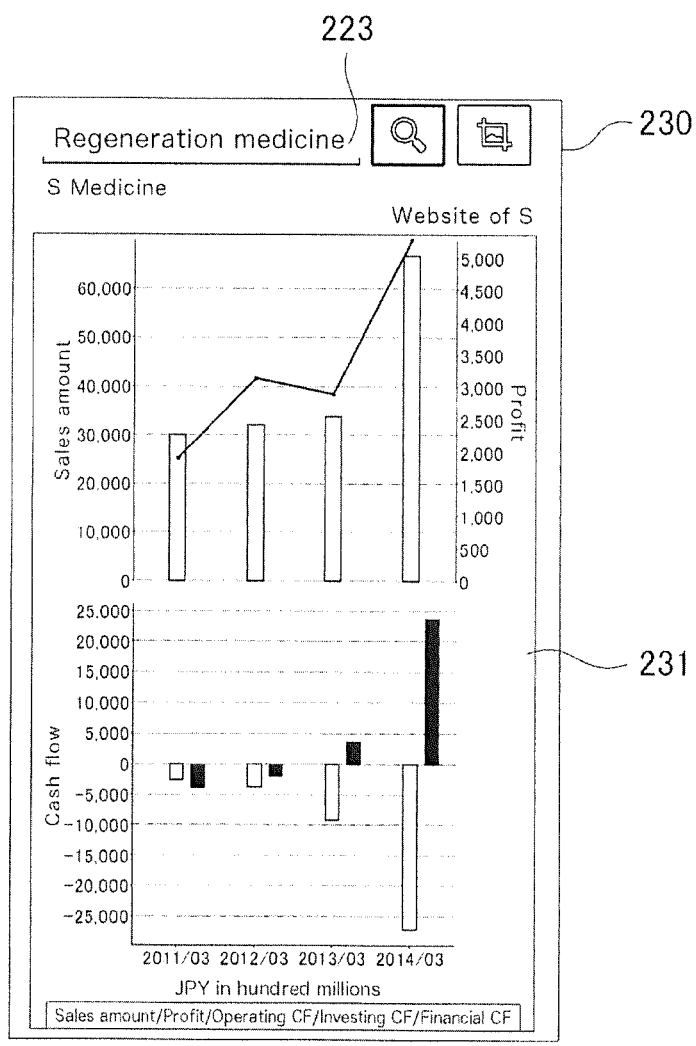
FIG. 3B is a conceptual diagram showing a screen on a communication terminal according to the first embodiment.

With a tap on the rectangular region 221a selected, an information page 230 in the third layer corresponding to this rectangular region 221a is displayed (see FIG. 3B). The information page 230 shows a cash flow graph 231 or the like of the company corresponding to the rectangular region 221a. With the information page 230 in the third layer displayed, the application 200 sets the variables for display condition as [industry code=null, company code=the company code of the company selected, search word=null, URL=null].

By operating the smart phone 120, it is possible to enlarge or reduce the size of the cash flow graph 231, to move the display position, and to return to the information pages 210, 220 to display.

(2) Operation for Displaying Search Result Page

The following describes the operation for displaying a search result page in the first embodiment.

When a search keyword is inputted in the keyword input box 213, 223 and the search button 214, 224 is tapped on the above described information page 210 or 220, the application 200 sends a search request to the front server 114. In the following description, assume that the term "regenerative medicine" is inputted as a search keyword.

Having received the search request from the application 200, the front server 114 requests the search server 115 to search. The search server 115 conducts full text search relative to the information stored in the economic information database 111, and sends search results to the front server 114.

Having received the search results from the search server 115, the front server 114 creates and sends a search result page (that is, a web display program for displaying the search result page on the smart phone 120) that shows the search results. In the above, the front server 114 may send all the hierarchical search result pages or only the highest-order search result page (see FIG. 4A) at that time with a search result page in a lower layer to be sent later upon a request from the application 200.

Figure 4A:
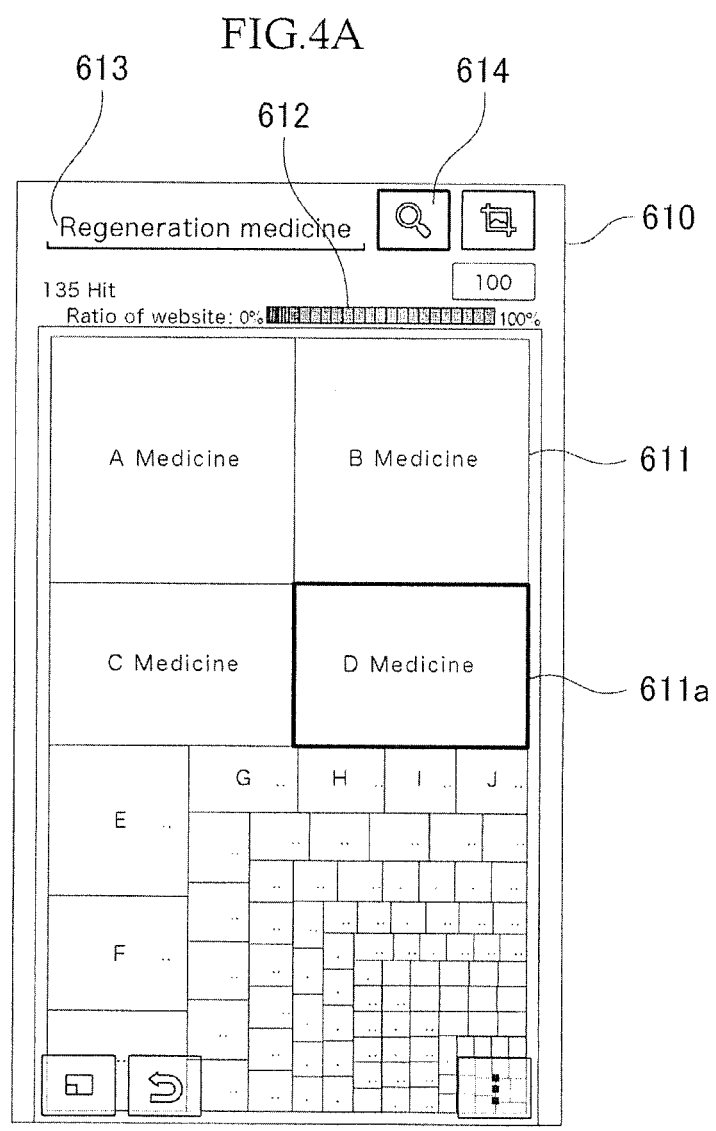
FIG. 4A is a conceptual diagram showing a screen on a communication terminal according to the first embodiment.

As illustrated in FIG. 4A, the highest-order search result page 610 shows a tree map 611 showing the search results, a color scale 612, a keyword input box 613, and a search button 614.

The tree map 611 shows the search results (that is, economic information containing the keyword "regenerative medicine" in the text thereof) classified for every company. The area of the rectangular region 611a corresponding to each industry in the tree map 611 is determined in accordance with the number of economic information items hit in the search. The color of the rectangular region 611a is set so as to change gradually in accordance with the ratio by type of the economic information items hit in the search (here, the ratio between information disclosed on company web sites and information for legal disclosure).

In the color scale 612, the color same as the color used to display the rectangular region 611*a* is sequentially arranged, starting from the side for a fewer number of economic information items.

With the search result page 610 displayed, the application 200 sets the variables for display condition as [industry code=null, company code=null, search word=regenerative medicine, URL=null].

By operating the smart phone 120, it is possible to change the number of companies (the number of rectangular regions) for concurrent display on the search result page 610, and to enlarge or reduce the size of display.

With a tap on a desired rectangular region 611*a* in the tree map 611, the rectangular region 611*a* is selected and displayed enhanced. Concurrently, the color region in the color scale 612 corresponding to the selected rectangular region 611*a* is enhanced.

With a long press on the selected rectangular region 611*a* by a finger, the application 200 displays a pop-up screen 611*b* (not shown) near the rectangular region 611*a*. The pop-up screen 611*b* shows, for example, information (for example, the company name, and the number of articles hit) corresponding to the rectangular region 611*a* selected.

Figure 4B:
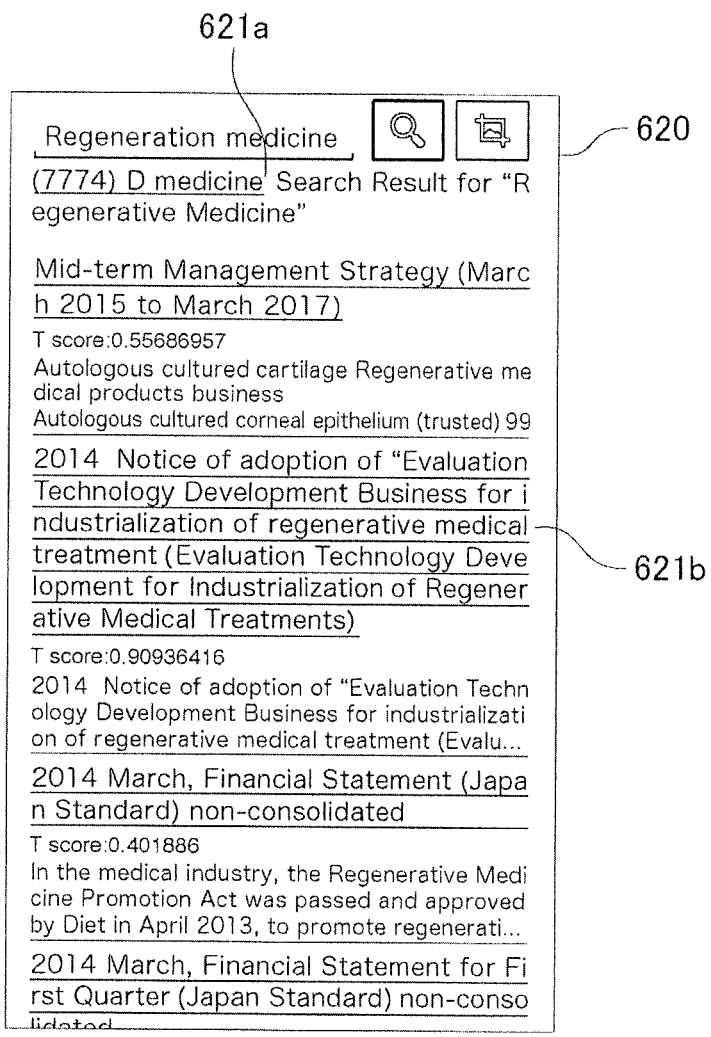
FIG. 4B is a conceptual diagram showing a screen on a communication terminal according to the first embodiment.
Figure 5A:
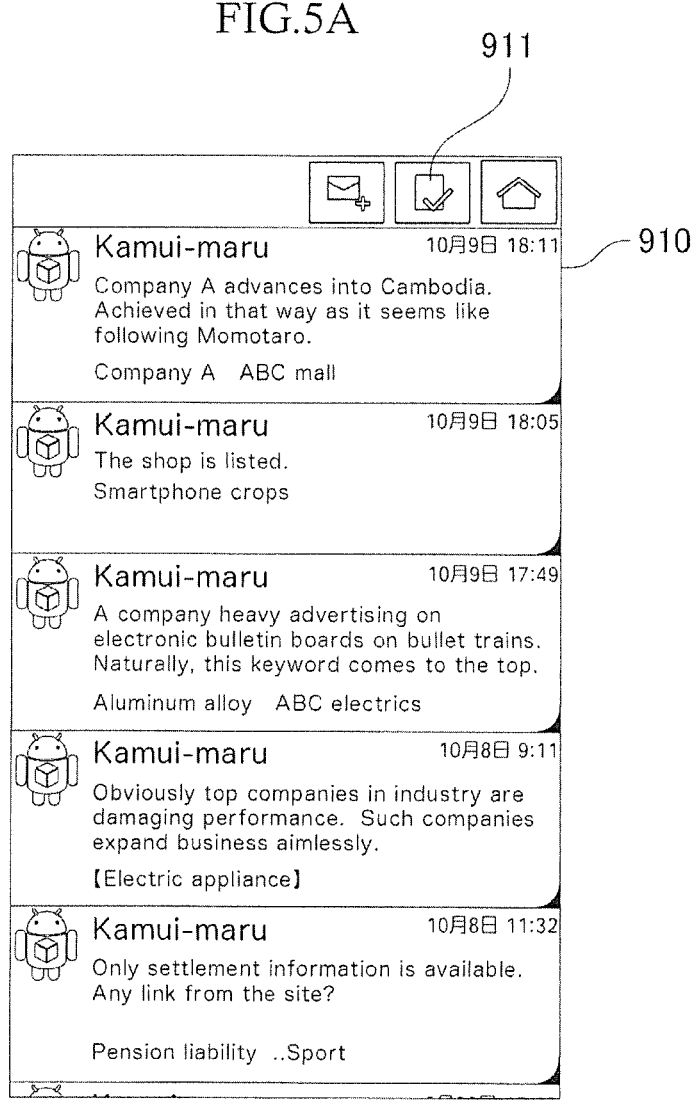
FIG. 5A is a conceptual diagram showing a screen on a communication terminal according to the first embodiment.
Figure 5B:
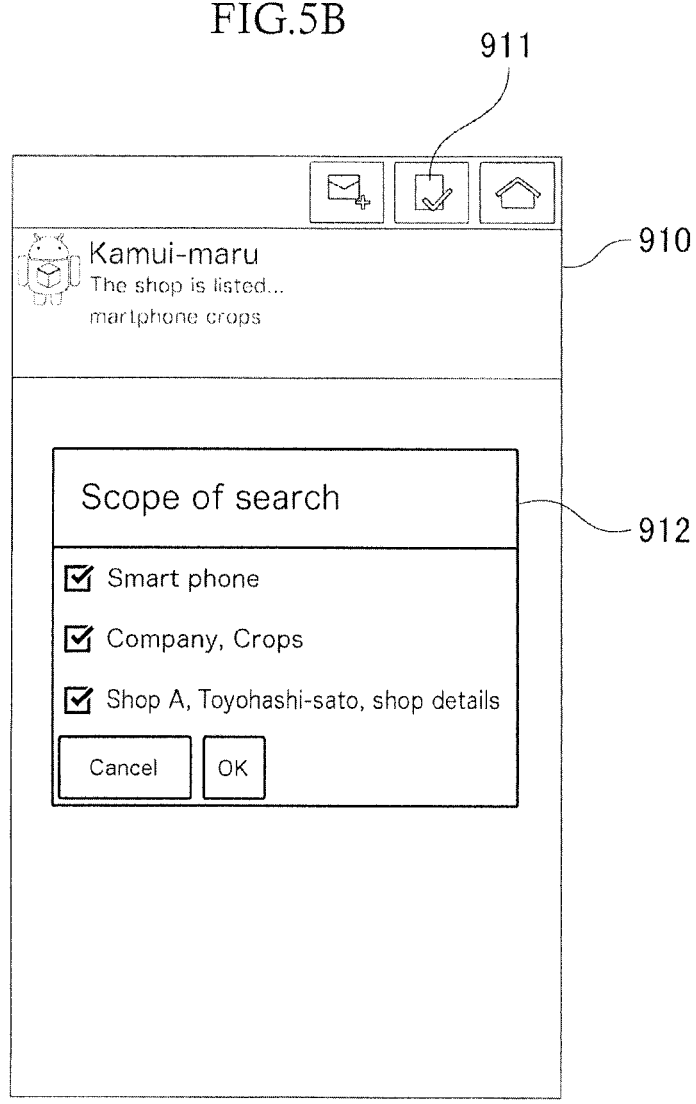
FIG. 5B is a conceptual diagram showing a screen on a communication terminal according to the first embodiment.

With a tap on the selected rectangular region 611*a*, a search result page 620 in the second layer is displayed (see FIG. 4B). The search result page 620 shows a list including the company name 621*a* and the title 621*b* of economic information concerning the company (economic information containing the keyword "regenerative medicine" in the text thereof) with an excerpt of the article shown under the title 621*a*. With a long press on the excerpt with a finger by an operator of the smart phone 120, the keyword "regenerative medicine" and texts preceding and following the keyword pop up for display (not shown).

With the search result page 620 displayed, the application 200 sets the variables for display condition as [industry code=null, company code=the company code of the company selected, search word=regenerative medicine, URL=null].

With a tap on the company name 621*a* on the search result page 620, a cash flow graph or the like is displayed as a search result page in the third layer. The search result page is prepared based on the viewing data same as that for the information page 230 (see FIG. 3B), and thus shows substantially the same content as that of the information page 230. Meanwhile, with a tap on the title 621*b* on the search result page 620, the article is displayed as the search result page in the third layer.

The part of the company name 621*a* is linked to the website of the company. In response to an operator's tapping the link, the application 200 displays the company web site through a browser function, and sets the variables for display condition as [industry code=null, company code=the company code of the company selected, search word=regenerative medicine, URL=URL of a website being displayed].

(3) Operation for Displaying Posted Page

The following describes the operation for displaying a posted page in the first embodiment.

In the first embodiment, each of the posted articles stored in the posted article database 112 is assigned with a plurality of tags including at least one tag corresponding to the variables for display condition of the central panel, namely, [industry code, company code, search word, URL]. With the above, it is possible to change the articles to be displayed on the posted pages, depending on the display condition of the central panel as to be described below.

The highest-order information page 210 shows the tree map 211 showing sales for every industry (see FIG. 2A), as described above. The variables for display condition then are set as [industry code=null, company code=null, search word=null, URL=null]. When an operator swipes to the left under this display condition, the application 200 requests the posted page creating unit 114*b* to send a posted page (that is, a web display program for displaying the posted page on the smart phone 120), and sends the variables for display condition and the number of articles to be displayed. Having received the request, the posted page creating unit 114*b* reads out sequentially the number of posted articles, the number being coincident with the number of posted articles to be displayed sent from the application 200, from the posted article database 112, beginning with the latest posted article, and creates a posted page. The posted page creating unit 114*b* then sends the posted page created to the application 200. Having received the posted page 910, the application 200 displays the posted page 910 on the smart phone 120 (see FIG. 5A).

The information page 220 in the second layer shows the tree map 221 showing sales for every company in the selected industry (see FIG. 3A), as described above. The variables for display condition then are set as [industry code=the industry code of the industry selected, company code=null, search word=null, URL=null]. When an operator swipes to the left under this display condition, the application 200 requests the posted page creating unit 114*b* to send the posted page 910, and sends the variables for display condition and the number of articles to be displayed to the posted page creating unit 114*b*. Having received the request, the posted page creating unit 114*b* creates a posted page 910 that shows an article with a tag assigned thereto that is coincident with the industry code indicated by the variable. As a result, a posted page 910 showing the number of articles posted with respect to the information page 220 in the second layer then displayed and articles posted with respect to all the cash flow graphs 231 in a layer lower than the layer of the information page 220 then displayed, is created, the number being coincident with the number of articles to be displayed sent from the application 200. The posted page 910 created is sent to the application 200 and displayed on the smart phone 120.

The information page in the third layer shows the cash flow graph 231 of the company selected (see FIG. 3B) as described above. The variables for display condition then are set as [industry code=null, company code=the company code of the company selected, search word=null, URL=null]. When an operator swipes to the left under this display condition, the application 200 requests the posted page creating unit 114*b* to send the posted page 910, and also sends the variables for display condition and the number of articles to be displayed to the posted page creating unit 114*b*. As a result, the posted page creating unit 114*b* creates a posted page 910 showing the number of posted articles each with a tag assigned thereto that is coincident with the company code (that is, an article posted with respect to the company displayed), the number being coincident with the number of articles to be displayed sent from the application 200, and sends the posted page 910 created to the application 200. The application 200 receives the posted page 910, and displays on the smart phone 120.

The posting time and date (or the range of positing time and date) of a posted article to be displayed may be designated when the posted page 910 is displayed.

The posted page shows a narrow-down button 911. With a tap on the narrow-down button 911, a narrow-down dialog 912 is displayed (see FIG. 5B). The narrow-down dialog 912 shows a list of tags imparted to the posted articles. When an operator of the smart phone 120 changes the setting for designation/non-designation of each tag shown in the narrow-down dialog 912, the range for posted articles to be displayed on the posted page 910 can be changed.

As described above, when an operator of the smart phone 120 taps its desired posted article on the posted page 910 displayed, that posted article is selected. Then, the application 200 changes the variables for display condition in accordance with the tag assigned to the selected posted article. Specifically, in the case where the posted page 910 has been switched from the highest-order information page 210 in response to a leftward swipe, all the posted articles are targets to be displayed as variables for display condition are set as [industry code=null, company code=null, search word=null, URL=null]. Then, when an operator selects any posted article which has a company code imparted thereto, the application 200 changes the variables for display condition to [industry code=null, company code=the company code coincident with the tag, search word=null, URL=null]. Thereafter, when the operator switches from the right panel to the central panel display (that is, when the operator swipes to the right, for example), a page (the information page 230 here) based on the changed variables is displayed on the central panel. Meanwhile, when the operator switches from the right panel to the central panel with no posted article selected, the immediately previously displayed information page is restored for display as variables for display condition are not changed.

An operator of the smart phone 120 can post an article on the posted page through an operation substantially the same as that for a conventional blog, or the like. With a new article posted, the application 200 imparts a tag corresponding to the variables for display condition at that time, namely, [industry code, company code, search word, URL] to the posted article. Another tag, different from those corresponding to these four variables, may be additionally imparted. The posted article is thereafter sent to the information viewing system 110 and stored in the posted article database 112.

In the above, a case where information page 210, 220, 230 is displayed on the central panel has been described. The above description is similarly applicable to a case where the search result page 610, 620 is displayed on the central panel. The range of the posted articles to be displayed on the posted page 910 is desirably changed depending on the variables for display condition, namely, [industry code, company code, search word, URL].

As described above, according to the first embodiment, the hierarchical information pages 210 to 230 are created and the posted page 910 as well is created with respect to the information page displayed on the central panel. With the above, an operator of the smart phone 120 can efficiently view an article posted with respect to the selected information page by a simple operation.

According to the first embodiment, not only an article posted with respect to an information page displayed on the central panel but also an article posted with respect to lower-order information pages of the displayed information page can be displayed on the posted page 910. With the above, in the case where a plurality of companies belong to the same industry, articles posted with respect to different companies can be collectively displayed on one posted page 910. Furthermore, it can be arranged such that, for example, a plurality of information pages for a specific company are provided, so that articles posted with respect to the specific company can be collectively displayed on one screen of the posted page 910. This arrangement may expectedly create an opportunity for an operator to access notable information in an article posted with respect to a company or industry which the operator has not particularly noticed so far.

According to the first embodiment, when an operator of the smart phone 120 searches, the search result page 610, 620 showing search results is created. With the above, the operator can efficiently view the search result page and an article posted with respect to the search result (an article on the posted page 910) by a simple operation.

According to the first embodiment, it is only required to swipe to the left to shift directly from the information pages 210 to 230 to a posted page corresponding to the information pages 210 to 230. With the above, an operator of the smart phone 120 can readily and efficiently view the posted articles corresponding to the information pages 210 to 230.

According to the first embodiment, it is only required to swipe to the right to shift directly from the posted page 910 to the information pages 210 to 230 and the search result pages 610, 620 corresponding to the posted page. With the above, an operator of the smart phone 120 can readily and efficiently view the information page corresponding to the posted article.

Although an example in which two kinds of display screens (the central panel and the right panel) are mutually switched is described in the above described first embodiment, any number of display screens are mutually switchable. For example, a left panel may be included in the first embodiment to implement a configuration that switches three kinds of display screens, so that the left panel shows news, for example, Although an example of an information viewing system that stores economic information to be viewed by a user is described in the above described first embodiment, the present invention can be applied to a system for other types of information.

REFERENCE SIGNS LIST

110 information viewing system
111 economic information database
112 posted article database
113 user management database
114 front server
114a information page creating unit
114b posted page creating unit
114c communication processing unit
115 search server
210, 220, 230 information page
610, 620 search result page
910 posted page

The invention claimed is:
1. An information viewing system comprising:
at least one microprocessor; and
at least one memory that couples to the at least one microprocessor and that stores instructions which when executed by the at least one microprocessor cause the at least one microprocessor to implement a front server;
the at least one memory stores an information database to store a plurality of data items;
the at least one memory stores a posted article database to store posted articles; and the front server is configured to connect to a plurality of communication terminals via a communication network, and configured to implement;

an information page creating unit to classify the plurality of data items stored in the information database and create a plurality of ordered hierarchical information pages based on the classified plurality of data items and to serve the plurality of ordered hierarchical information pages to be displayed by a communication terminal among the plurality of communication terminal;

a posted page creating unit to extract from the posted article database, posted articles associated with data items of each of the plurality of ordered hierarchical information pages and to create posted article pages corresponding to each of the plurality of ordered hierarchical information pages based on the extracted posted articles associated with each of the plurality of ordered hierarchical information pages, respectively, wherein a posted article among the posted articles stored in the posted article database is posted in association with an information page among the plurality of ordered hierarchical information pages through an operation from the communication terminal, and upon performing the operation, the posted article is stored in association with the information page in the posted article database;

a communication processing unit to send the plurality of ordered hierarchical information pages and the corresponding posted article pages to the communication terminal to be displayed, and a search processing unit to conduct a search in response to a search word received from a search request from the communication terminal and send corresponding search results to the information page creating unit, wherein based upon receiving the search results from the search processing unit, the information page creating unit creates a plurality of ordered hierarchical search result pages based on the search results and displays the plurality of ordered hierarchical search result pages on the communication terminal, wherein the information page creating unit uses a set of variables including an industry code, a company code, a search word and a Uniform Resource Locator (URL) for a display condition to display each of the plurality of ordered hierarchical search result pages on a screen of the communication terminal including, displaying a search result page in a first layer in form of a tree map, showing search results containing the search word received from the search request from the communication terminal that represent sales data for a plurality of industries, wherein each industry is represented by a region of the tree map on the screen of the communication terminal, and the area of each region is determined in accordance with a number of hits in the search results that fall in the industry, upon a tap operation on a specific region of the tree map, displaying a search result page in a second layer representing a list of search results in an industry represented by the tapped region of the tree map, wherein each search result on the search result page in a second layer includes a company name to indicate the company that the search result pertains to, upon a tap operation on the company name of a search result on the search result page in a second layer, displaying a cash flow graph as a search result page in a third layer showing financial information of the company;

in response to receiving a display change operation from the tree map representing the search result page in a first layer displayed on the screen of the communication terminal, the posted page creating unit extracts from the posted article database posted articles associated with the displayed search result page in a first layer and lower layer search result pages of the displayed search result page in a first layer, creates a posted article page including the extracted posted articles, and sends the posted article page to the communication terminal to be displayed on the screen; and in response to receiving another display change operation upon a selection of a posted article from among the displayed posted articles on the posted article page, the communication terminal displays a search result page corresponding to the selected posted article.

2. The information viewing system according to claim 1, wherein, the communication terminal requests the front server to send posted article pages corresponding to each of the plurality of ordered hierarchical information pages displayed on the screen of the communication terminal.

3. An information viewing system comprising:
at least one microprocessor; and
at least one memory that couples to the at least one microprocessor and that stores instructions which when executed by the at least one microprocessor cause the at least one microprocessor to implement a front server;
a plurality of communication terminals having a display;
the at least one memory stores an information database to store a plurality of data items;
the at least one memory stores a posted article database to store posted articles; and
the front server is configured to connect to the plurality of communication terminals via a communication network, and configured to implement;

an information page creating unit to classify the plurality of data items stored in the information database and create a plurality of ordered hierarchical information pages based on the classified plurality of data items and to serve the plurality of ordered hierarchical information pages to be displayed by a communication terminal among the plurality of communication terminals;

a posted page creating unit to extract from the posted article database, posted articles associated with data items of each of the plurality of ordered hierarchical information pages and to create posted article pages corresponding to each of the plurality of ordered hierarchical information pages based on the extracted posted articles associated with each of the plurality of ordered hierarchical information pages, respectively, and wherein a posted article among the posted articles stored in the posted article database is posted in association with an information page among the plurality of ordered hierarchical information pages through an operation from the communication terminal, and upon performing the operation, the posted article is stored in association with the information page the posted article database;

a communication processing unit to send the plurality of ordered hierarchical information pages and the corresponding posted article pages to the communication terminal to be displayed, and a search processing unit to conduct a search in response to a search word received from a search request from the communication terminal and send corresponding search results to the information page creating unit, wherein based upon receiving the search results from the search processing unit, the information page creating unit creates a plurality of ordered hierarchical search result pages based on the received search results and displays the plurality of ordered hierarchical search result pages on the communication terminal, wherein the information page creating unit uses a set of variables including an industry code, a company code, a search word and a Uniform Resource Locator (URL) for a display condition to display each of the plurality of ordered hierarchical search result pages on a screen of the communication terminal including, displaying a search result page in a first layer in form of a tree map, showing search results containing the search word received from the search request from the communication terminal that represent sales data for a plurality of industries, wherein each industry is represented by a region of the tree map on the screen of the communication terminal, and the area of each region is determined in accordance with a number of hits in the search results that fall in the industry, upon a tap operation on a specific region of the tree map, displaying a search result page in a second layer representing a list of search results in an industry represented by the tapped region of the tree map, wherein each search result on the search result page in a second layer includes a company name to indicate the company that the search result pertains to, upon a tap operation on the company name of a search result on the search result page in a second layer, displaying a cash flow graph as a search result page in a third layer showing financial information of the company;

in response to receiving a display change operation from the tree map representing the search result page in a first layer displayed on the screen of the communication terminal, the posted page creating unit extracts from the posted article database posted articles associated with the displayed search result page in a first layer and lower layer search result pages of the displayed search result page in a first layer, creates a posted article page including the extracted posted articles, and sends the posted article page to the communication terminal to be displayed on the screen; and in response to receiving another display change operation upon a selection of a posted article from among the displayed posted articles on the posted article page, the communication terminal displays a search result page corresponding to the selected posted article.

4. The information viewing system according to claim 3, wherein the plurality of data items are related to economic information for registered users.

5. The information viewing system according to claim 3, wherein the posted articles stored in the posted article database are related to economic information for predetermined industries and companies for registered users.

6. A server comprising:

at least one microprocessor; and at least one memory that couples to the at least one microprocessor and that stores instructions which when executed by the at least one microprocessor cause the at least one microprocessor to implement a server;

the server configured to connect to a plurality of communication terminals, an information database to store a plurality of data items, and a posted article database to store posted articles posted with respect to the plurality of data items so as to be associated with corresponding data items, and the server configured to:

classify the plurality of data items stored in the information database and create a plurality of ordered hierarchical information pages based on the classified plurality of data items and to serve the plurality of ordered hierarchical information pages to be displayed by a communication terminal among the plurality of communication terminals;

extract from the posted article database, posted articles associated with data items of each of the plurality of ordered hierarchical information pages and to create posted article pages corresponding to each of the plurality of ordered hierarchical information pages based on the extracted posted articles associated with each of the plurality of ordered hierarchical information pages, respectively, wherein a posted article among the posted articles stored in the posted article database is posted in association with an information page among the plurality of ordered hierarchical information pages through an operation from the communication terminal, and upon performing the operation, the posted article is stored in association with the information page in the posted article database;

send the plurality of ordered hierarchical information pages and the corresponding posted article pages to the communication terminal to be displayed, and wherein the server is to further configured conduct a search in response to a search word received from a search request from the communication terminal and send corresponding search results to the communication terminal, wherein create a plurality of ordered hierarchical search result pages based on the search results and send the plurality of ordered hierarchical search result pages to the communication terminal to be displayed, wherein the server uses a set of variables including an industry code, a company code, a search word and a Uniform Resource Locator (URL) for a display condition to display each of the plurality of ordered hierarchical search result pages on a screen of the communication terminal, including, displaying a search result page in a first layer in form of a tree map, showing search results containing the search word received from the search request from the communication terminal that represent sales data for a plurality of industries, wherein each industry is represented by a region of the tree map on the screen of the communication terminal, and the area of each region is determined in accordance with a number of hits in the search results that fail in the industry, upon a tap operation on a specific region of the tree map, displaying a search result page in a second layer representing a list of search results in an industry represented by the tapped region of the tree map, wherein each search result on the search result page in a second layer includes a company name to indicate the company that the search result pertains to, upon a tap operation on the company name of a search result on the search result page in a second layer, displaying a cash flow graph as a search result page in a third layer showing financial information of the company;

in response to receiving a display change operation from the tree map representing the search result page in a first layer displayed on the screen of the communication terminal, the server extracts from the posted article database posted articles associated with the displayed search result page in a first layer and lower layer search result pages of the displayed search result page in a first layer, creates a posted article page including the extracted posted articles, and sends the posted article page to the communication terminal to be displayed on the screen; and in response to receiving another display change operation upon a selection of a posted article from among the displayed posted articles on the posted article page, the communication terminal displays a search result page corresponding to the selected posted article.

* * * * *

UNITED STATES PATENT AND TRADEMARK OFFICE
CERTIFICATE OF CORRECTION

PATENT NO. : 10,824,631 B2  
APPLICATION NO. : 15/543394  
DATED : November 3, 2020  
INVENTOR(S) : Yoshimori Rikukawa Page 1 of 1

It is certified that error appears in the above-identified patent and that said Letters Patent is hereby corrected as shown below:

In the Claims

Column 11, Line 3:  
In Claim 1, delete "implement;" and insert -- implement: --, therefor.

Column 11, Line 11:  
In Claim 1, delete "terminal;" and insert -- terminals; --, therefor.

Column 12, Line 42:  
In Claim 3, delete "implement;" and insert -- implement: --, therefor.

Column 12, Line 67:  
In Claim 3, after "page" insert -- in --.

Column 14, Line 41:  
In Claim 6, after "server is" delete "to".

Column 14, Line 41:  
In Claim 6, after "configured" insert -- to --.

Column 14, Line 65:  
In Claim 6, delete "fail" and insert -- fall --, therefor.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*